(12) United States Patent
Mikami et al.

(10) Patent No.: US 6,492,586 B2
(45) Date of Patent: *Dec. 10, 2002

(54) SPACE PHOTOVOLTAIC POWER GENERATION SYSTEM, POWER SATELLITE, AND CONTROL SATELLITE

(75) Inventors: Izumi Mikami, Tokyo (JP); Hiroyuki Sato, Tokyo (JP); Tsuyoshi Ishikawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/838,271

(22) Filed: Apr. 20, 2001

(65) Prior Publication Data

US 2001/0035207 A1 Nov. 1, 2001

(30) Foreign Application Priority Data

Apr. 24, 2000 (JP) ........................................ 2000-163717

(51) Int. Cl.$^7$ ........................... H01L 31/042; B64G 1/44
(52) U.S. Cl. ........................ 136/292; 136/244; 136/246; 244/173
(58) Field of Search ................................. 136/292, 244, 136/246; 244/158 R, 159, 173; 322/2 R

(56) References Cited

U.S. PATENT DOCUMENTS

| | | | |
|---|---|---|---|
| 3,781,647 A | * 12/1973 | Glaser | 322/2 R |
| 4,305,555 A | * 12/1981 | Davis | 244/158 R |
| 5,223,781 A | * 6/1993 | Criswell et al. | 322/2 R |
| 5,885,367 A | * 3/1999 | Brown et al. | 136/245 |

OTHER PUBLICATIONS

Brown et al. "Beamed Microwave Power Transmission and its Application To Space" IEEE Transactions on Microwave Theory and Techniques, vol. 40, No. 6, Jun. 1992. pp. 1239–1250.*

East, T.W.R. "Noise Considerations in the Transmitting Array For The Solar Power Satellite" IEEE Canadian Conference on Electrical and Computer Engineering 1998. pp. 818–821, vol. 2.*

* cited by examiner

*Primary Examiner*—Nam Nguyen
*Assistant Examiner*—Brian L Mutschler
(74) *Attorney, Agent, or Firm*—Oblon, Spivak, McClelland, Maier & Neustadt, P.C.

(57) ABSTRACT

A space photovoltaic power generation system including a plurality of power satellites arranged in space, each of which converts electrical energy, into which sunlight has been photoelectric-converted, into a microwave, and transmits the microwave to an electric power base. The system can thus transmit a microwave of high power to the electric power base. As each of the plurality of power satellites changes its attitude in space, and its relative location therefore changes, each of the plurality of power satellites can adjust an amount of phase adjustment to be made to the microwave which each of the plurality of power satellites will transmit. A control satellite measures the location of each of the plurality of power satellites for the phase adjustment, and calculates the amount of phase adjustment for each of the plurality of power satellites. The control satellite then transmits the amount of phase adjustment to each of the plurality of power satellites.

20 Claims, 3 Drawing Sheets

SPACE PHOTOVOLTAIC POWER GENERATION SYSTEM, POWER SATELLITE, AND CONTROL SATELLITE

BACKGROUND OF THE INVENTION

1. Field of the Invention

The present invention relates to a space photovoltaic power generation system for receiving sunlight in space so as to generate electric power, for transmitting the electric power to an electric power base via space by converting the electric power to a microwave, and for storing the electric power in the electric power base so as to allow the use of the electric power, and a power satellite and a control satellite for use with the system.

2. Description of the Prior Art

A solar cell is known as a small-size power generation system which utilizes sunlight. Furthermore, a photovoltaic power generation panel or the like, which can be set up on a building, is known as a power generation system intended for the home which utilizes sunlight. Such a photovoltaic power generation system built on the earth's ground is not necessarily efficient fundamentally because of the attenuation of sunlight in the earth's atmosphere and the alternation between shade and light caused by the alternation between day and night. A solar panel, which can be installed in a satellite, is known as a photovoltaic power generation device intended for space. Satellites can thus achieve missions by privately generating necessary electric power for observation and communications, etc. by using a solar panel. In either of the prior art power generation systems, specific equipment connected to the solar cell by cable is adapted to use the energy generated by the solar cell.

On the other hand, as the communication technology progresses according to results of recent space development works and the construction technology to construct a large-scale space structure progresses, research and development of a system that receives sunlight in space, generates electric power, and transmits the generated energy to a specific place such as a specific location on the earth or in space has been actively conducted. An example of such a space photovoltaic power generation system can focus sunlight, thereby increasing the energy density of the sunlight, to a number of solar panels each having a specific size and connected mechanically and electrically to each other, for photoelectric-converting the incident sunlight so as to generate electric power, by using a combination of reflectors, lenses, etc., and then generates a microwave based on the generated energy and transmits the microwave to an electric power base built on the earth's ground. The microwave transmitted to the ground is spread over a range wide so that its energy density becomes small in consideration of safety. The electric power base built on the earth's ground includes a number of receiving antennas arranged in an area of several tens of square kilometers, receives incident microwaves by means of these receiving antennas, and integrates the received microwaves into high electric power.

In the prior art space photovoltaic power generation system as mentioned above, a large-scale electric power generation and transmission structure can be constructed in space by adding a number of solar cells to a transmission antenna and microwave generation equipment arranged in space as the core of the system. However, a problem with the prior art space photovoltaic power generation system constructed as above is that since the electric power from the plurality of solar cells fundamentally concentrates on the microwave generation equipment and the transmission antenna, both a limit on the electric power transmission due to a discharge breakdown that occurs in a power supply line and a limit on the amplification capability of the microwave generation equipment impose a limit on the power generation capacity of the space photovoltaic power generation system.

SUMMARY OF THE INVENTION

The present invention is proposed to solve the above-mentioned problem. It is therefore an object of the present invention to provide a space photovoltaic power generation system capable of transmitting electric power generated in space from sunlight to an electric power base so that the electric power is dispersed without concentrating the electric power generated to a point on the electric power base, and a power satellite and a control satellite for use with the system.

In accordance with an aspect of the present invention, there is provided a space photovoltaic power generation system comprising: a plurality of power satellites each for generating electrical energy from sunlight in space, for generating a microwave from the generated electrical energy, and for transmitting the microwave; an electric power base located at a remote site for receiving a plurality of microwaves transmitted from the plurality of power satellites, and for generating electric power from the plurality of microwaves received; and a control unit for controlling the plurality of power satellites so that the plurality of microwaves transmitted from the plurality of power satellites to the electric power base are in phase with one another.

In accordance with a preferred embodiment of the present invention, the control unit includes a location measurement unit for measuring a location of each of the plurality of power satellites, a phase adjustment amount calculation unit for calculating an amount of phase adjustment to be made to the microwave which each of the plurality of power satellites will transmit from the measured location, and a phase control unit for adjusting a phase of the microwave which each of the plurality of power satellites will transmit according to the amount of phase adjustment calculated by the phase adjustment amount calculation unit so that the plurality of microwaves transmitted from the plurality of power satellites to the electric power base are in phase with one another.

Preferably, the space photovoltaic power generation system further comprises a control satellite including the location measurement unit, the phase adjustment amount calculation unit, and a transmission unit for informing each of the plurality of power satellites of the amount of phase adjustment calculated for each of the plurality of power satellites. Each of the plurality of power satellites can include a receiving unit for receiving the amount of phase adjustment from the control satellite, a target for enabling the control unit to measure the location of each of the plurality of power satellites, a condensing unit for focusing sunlight in space, a photoelectric conversion unit for receiving and converting the sunlight focused by the condensing unit into electrical energy, and a transmission unit that also serves as the phase control unit, for generating a microwave based on the electrical energy from the photoelectric conversion unit, for adjusting the phase of the microwave according to the amount of phase adjustment received by the receiving unit, and for transmitting the microwave to the electric power base. The location measurement unit of the control satellite can be a unit for measuring the location of each of the plurality of power satellites using the target disposed in each of the plurality of power satellites, and the transmission unit of the control satellite can be a unit for transmitting a control signal including the amount of phase adjustment calculated by the phase adjustment amount calculation unit to each of the plurality of power satellites.

As an alternative, the space photovoltaic power generation system can further comprise a control satellite including the location measurement unit, and a transmission unit for informing each of the plurality of power satellites of data on the location of each of the plurality of power satellites measured by the location measurement unit. In addition, each of the plurality of power satellites can include the phase adjustment amount calculation unit and the phase control unit, and adjusts the phase of the microwave which each of the plurality of power satellites will transmit so that the microwave is in phase with any other microwave transmitted from any other one of the plurality of power satellites according to the calculated amount of phase adjustment. Each of the plurality of power satellites can include a target for enabling the location measurement unit of the control unit to measure the location of each of the plurality of power satellites, a condensing unit for focusing sunlight in space, a photoelectric conversion unit for receiving and converting the sunlight focused by the condensing unit into electrical energy, and a transmission unit that also serves the phase control unit, for generating a microwave based on the electrical energy from the photoelectric conversion unit, for adjusting the phase of the microwave according to the amount of phase adjustment calculated by the phase adjustment amount calculation unit, and for transmitting the microwave to the electric power base. The location measurement unit of the control satellite can be a unit for measuring the location of each of the plurality of power satellites using the target disposed in each of the plurality of power satellites, and the transmission unit of the control satellite can be a unit for transmitting a control signal including data on the location of each of the plurality of power satellites measured by the location measurement unit to each of the plurality of power satellites.

In accordance with another preferred embodiment of the present invention, the control unit transmits an identical reference signal to each of the plurality of power satellites, and each of the plurality of power satellites generates a microwave based on the reference signal received and transmits the microwave to the electric power base.

In accordance with a further preferred embodiment of the present invention, the electric power base includes a transmission unit for transmitting a beacon signal to the control satellite, a receiving unit for receiving the plurality of microwaves transmitted from the plurality of power satellites, a microwave-to-DC conversion unit for converting the plurality of microwaves received by the receiving unit into DC electric power, and a DC electric power transmission unit for transmitting the DC electric power obtained by the microwave-to-DC conversion unit.

In accordance with another aspect of the present invention, there is provided a power satellite comprising: a condensing unit for focusing sunlight in space; a photoelectric conversion unit for receiving and converting the sunlight focused by the condensing unit into electrical energy; and a transmission unit for generating a microwave based on the electrical energy from the photoelectric conversion unit, for adjusting a phase of the microwave so that the microwave is in phase with any other microwave transmitted by any other power satellite, and for transmitting the microwave to space.

In accordance with a further aspect of the present invention, there is provided a control satellite comprising: a location measurement unit for measuring a location of each of a plurality of power satellites, each of which generates a microwave from sunlight in space and transmits the microwave, by using a target disposed in each of the plurality of power satellites; a phase adjustment amount calculation unit for calculating an amount of phase adjustment to be made to the microwave which each of the plurality of power satellites will transmit from the location of each of the plurality of power satellites measured by the location measurement unit; and a transmission unit for transmitting a control signal including the amount of phase adjustment calculated by the phase adjustment amount calculation unit to each of the plurality of power satellites.

Further objects and advantages of the present invention will be apparent from the following description of the preferred embodiments of the invention as illustrated in the accompanying drawings.

DETAILED DESCRIPTION OF THE PREFERRED EMBODIMENT

Figure 1:
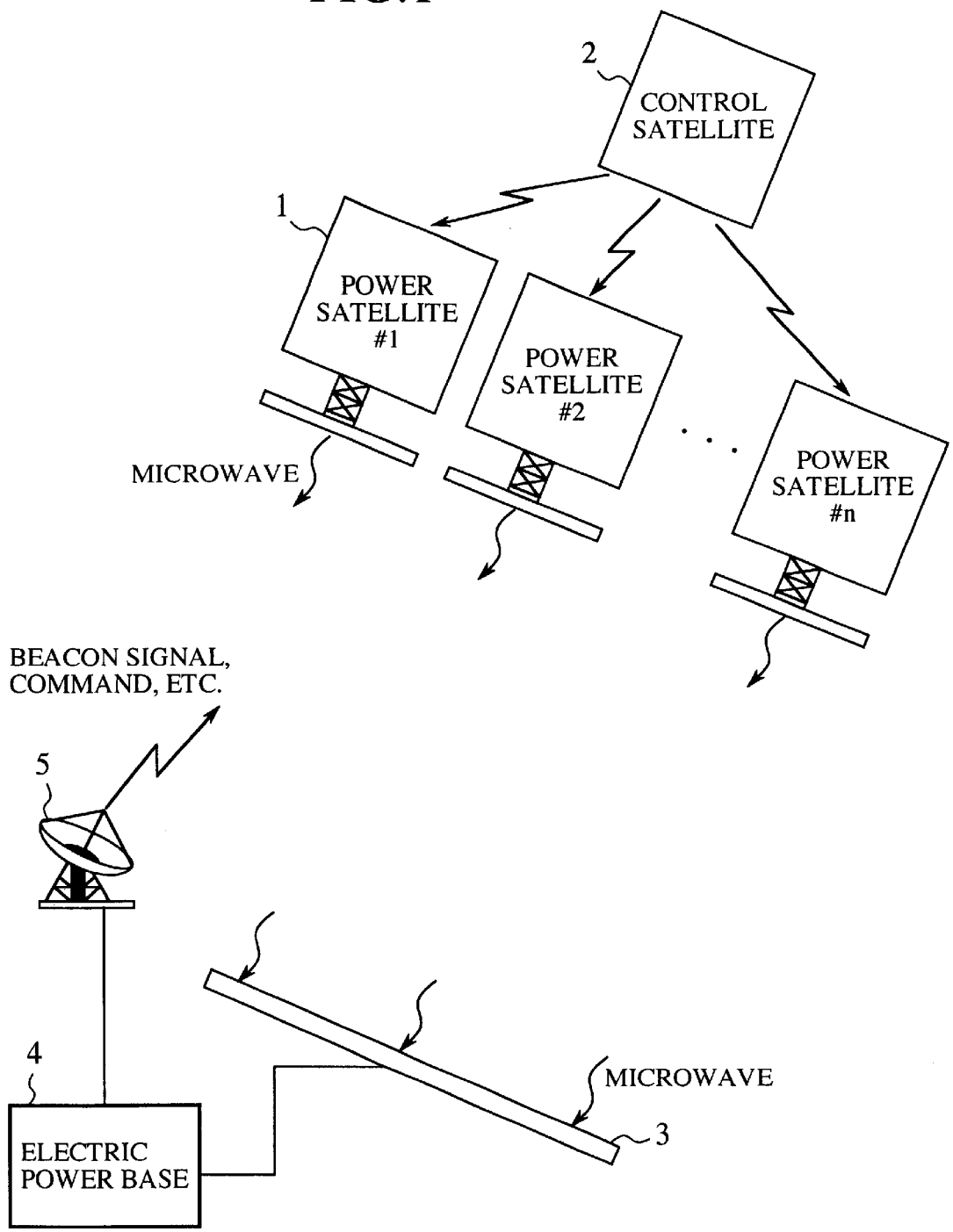
FIG. 1 is a diagram showing the structure of equipment used for a space photovoltaic power generation system according to an embodiment of the present invention.
Figure 2:
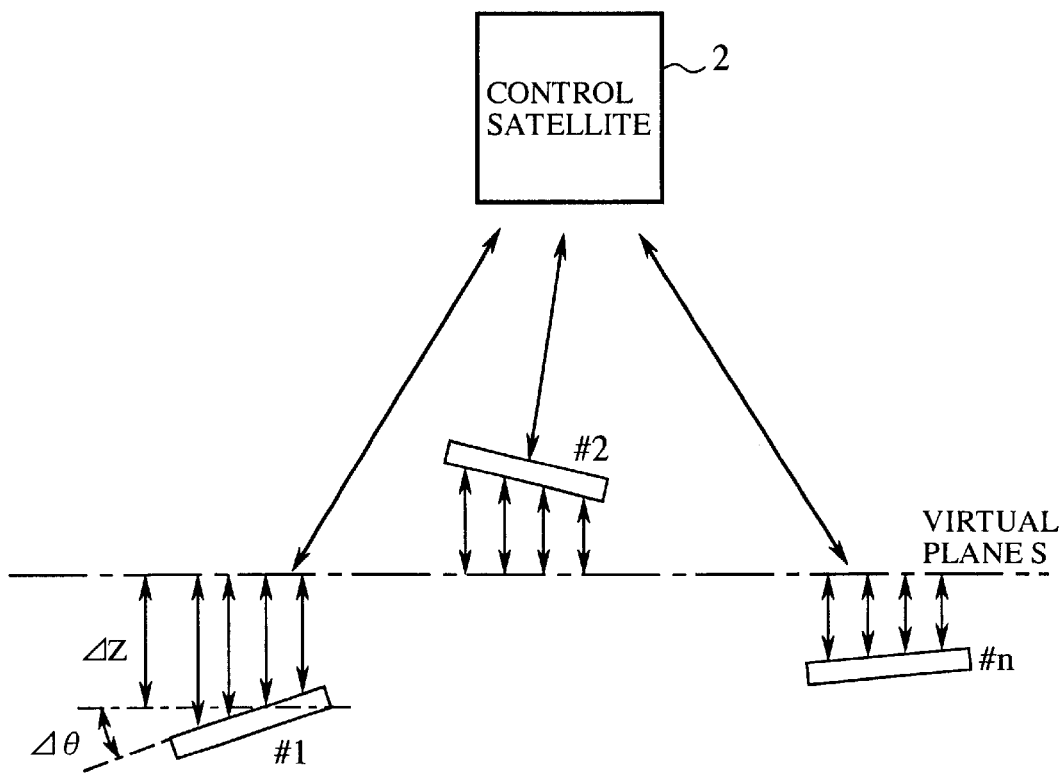
FIG. 2 is a diagram showing the principle underlying a phase adjustment performed by the space photovoltaic power generation system according to the embodiment of the present invention.
Figure 4:
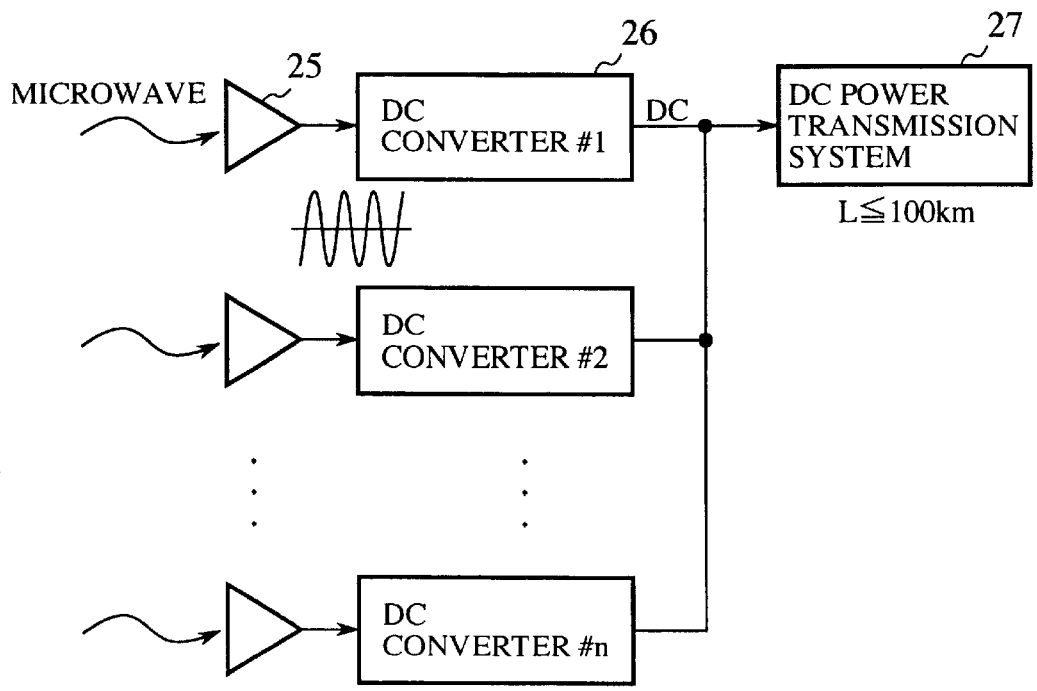
FIG. 4 is a block diagram showing the structure of an electric power base of the space photovoltaic power generation system according to the embodiment of the present invention.
Figure 3:
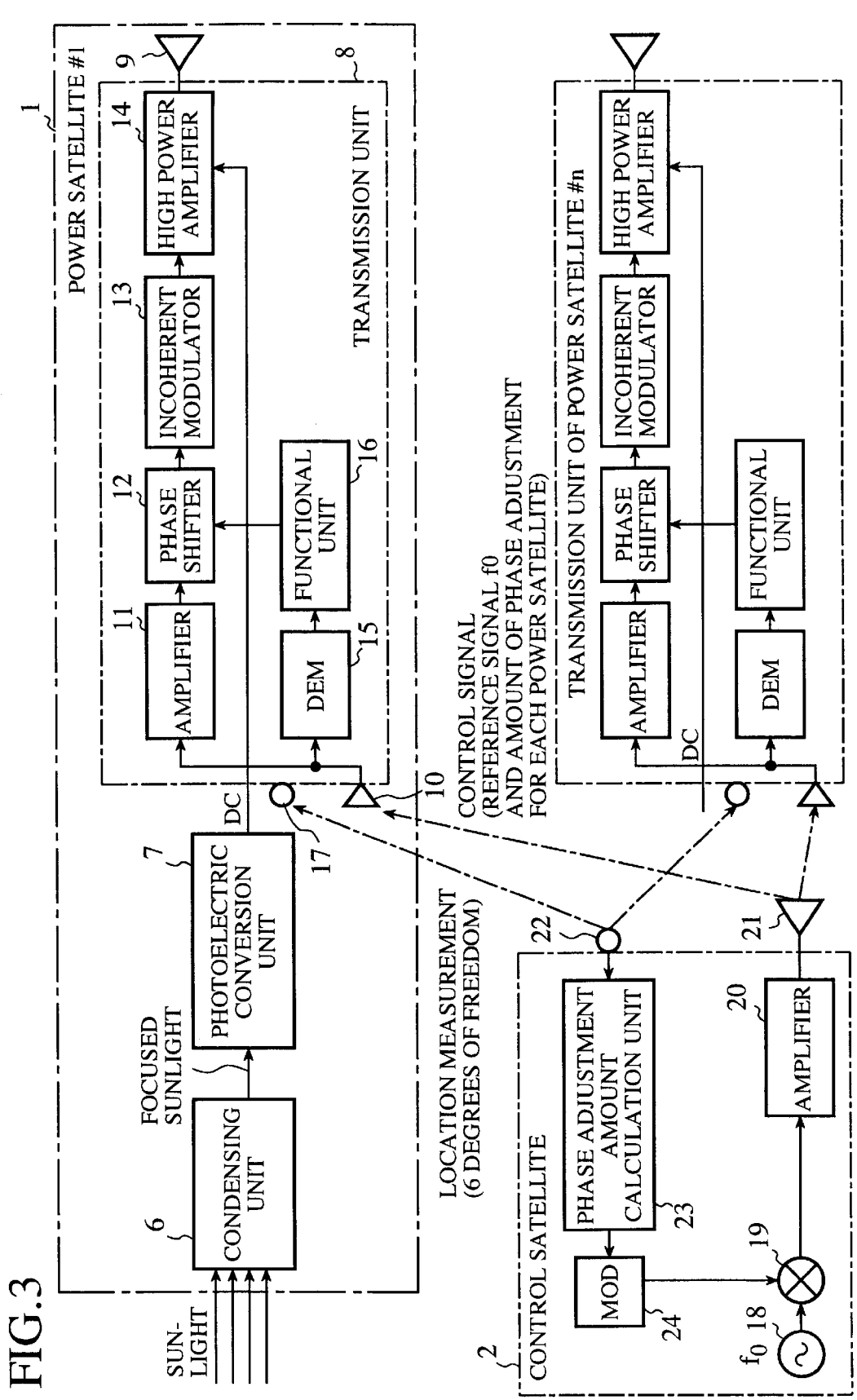
FIG. 3 is a block diagram showing the structure of a power satellite and a control satellite of the space photovoltaic power generation system according to the embodiment of the present invention.

A description will be made as to a space photovoltaic power generation system according to an embodiment of the present invention, a power satellite, a control satellite, and an electric power base for use with the system, with reference to FIGS. 1 to 4. FIG. 1 is a diagram showing the structure of equipment used for the space photovoltaic power generation system according to the embodiment. FIG. 2 is a diagram showing the principle underlying a phase adjustment performed by the space photovoltaic power generation system according to the embodiment. FIG. 3 is a block diagram showing the structure of the power satellite and the control satellite of the space photovoltaic power generation system according to the embodiment. FIG. 4 is a block diagram showing the structure of the electric power base of the space photovoltaic power generation system according to the embodiment.

In FIG. 1, reference numeral 1 denotes a power satellite for generating electrical energy from sunlight received in space, for generating a microwave from the electrical energy, and for transmitting the microwave. As shown in the figure, the space photovoltaic power generation system is provided with a plurality of power satellites #1 to #n. Reference numeral 2 denotes a control satellite for controlling an amount of phase adjustment to be made to the microwave which each of the plurality of power satellites 1 will transmit, numeral 3 denotes an electric power base antenna for receiving a plurality of microwaves transmitted from the plurality of power satellites 1, numeral 4 denotes an electric power base for generating electric power from the plurality of microwaves received by the antenna 3, and numeral 5 denotes a satellite communications antenna disposed for allowing communication between the electric power base 4 and the control satellite 2.

Each of the plurality of power satellites 1 further converts electrical energy, into which sunlight has been photoelectric-converted, into a microwave, and transmits the microwave to the electric power base 4. The electric power of the microwave that each of the plurality of power satellites 1 can transmit is determined by the capability to focus sunlight, the photoelectric-conversion capability, and the microwave amplification capability of each of the plurality of power satellites 1. The arrangement of the plurality of power satellites 1 in space makes it possible to transmit a microwave of high electric power to the electric power base 4. However, each of the plurality of power satellites 1 changes its attitude in space, and its relative location therefore changes. Therefore, when the plurality of power satellites 1 transmit microwaves independently, these microwaves may balance each other out or they may be transmitted in a direction different from a desired direction, i.e., a direction towards the electric power base 4. The space photovoltaic power generation system according to the present invention adjusts the amount of phase adjustment to be made to the microwave which each of the plurality of power satellites 1 will transmit so that the plurality of microwaves from the plurality of power satellites 1 are in phase with one another, in order to enable the electric power base 4 at a remote site to receive the plurality of microwaves from the plurality of power satellites 1. The space photovoltaic power generation system according to the present invention then receives the plurality of microwaves transmitted from the plurality of power satellites 1 by way of the electric power base antenna 3, and converts the plurality of microwaves received by the electric power base 4 into a low-frequency wave which can be used as electric power.

The electric power base 4 can be placed on the earth's ground. As an alternative, the electric power base 4 can be placed in such a location in space as a location of the surface of the moon, a space plant facility, or the like. When the electric power base 4 is located on the earth's ground, it is necessary to reduce the energy density (energy per unit area) of the microwave transmitted from each of the plurality of power satellites from the viewpoint of the flora and fauna environment and electric wave trouble. Therefore, the electric power base antenna 3 can have an area ranging from several tens of square kilometers to several hundreds of square kilometers. In general, such a huge antenna can be formed by arranging a number of antennas each having a specific size in the form of an array, for example. In this case, the electric power base 4 has a composite function of combining either the plurality of microwaves received via the plurality of antennas or a number of microwaves from each of a number of antenna groups in addition to a function of converting the composite microwave into a low-frequency wave.

In addition, the electric power base 4 includes the satellite communications antenna 5 as shown in FIG. 1. The electric power base 4 transmits a beacon signal to the control satellite 2 by way of the satellite communications antenna 5. The control satellite 2 can recognize the direction of the electric power base 4 by catching the beacon signal. The control satellite 2 controls the amount of phase adjustment to be made to the microwave which each of the plurality of power satellites 1 will transmit so that the microwave from each of the plurality of power satellites 1 can be transmitted in the direction.

Next, a description will be made as to the principle underlying the phase adjustment performed on the microwave which each of the plurality of power satellites 1 will transmit with reference to FIG. 2. In FIG. 2, plates designated by #1, #2, and #n depict the front surfaces of antennas included in the plurality of power satellites #1, #2, and #n, respectively. The control satellite 2 catches the beacon signal from the electric power base 4, and recognizes the direction of the electric power base 4, as mentioned above. The control satellite 2 defines a virtual plane S orthogonal to the direction, and determines a relationship between the virtual plane S and each of the plurality of antenna front surfaces #1, #2, and #n so as to calculate the amount of phase adjustment for each of the plurality of power satellites #1, #2, and #n. Each of the plurality of antenna front surfaces #1, #2, and #n has 6 degrees of freedom including three degrees of freedom in translation directions and three degrees of freedom in rotational directions, which change along with a change in the attitude of the corresponding power satellite. The control satellite 2 can fundamentally specify the location of each of the plurality of power satellites 1 or each of the plurality of antenna front surfaces by measuring distances between the control satellite and three points located on each of the plurality of power satellites 1 or each of the plurality of antenna front surfaces. The control satellite 2 then determines a difference between each of the plurality of antenna front surfaces and the virtual plane S from the virtual plane S and the location of each of the plurality of antenna front surfaces. The difference can be divided into a translational component $\Delta Z$ and a rotational component $\Delta \Theta$, as shown in FIG. 2. $\Delta Z$ component can be assumed to be one used for phase adjustment between the power satellite and the other power satellites and $\Delta \Theta$ component can be assumed to be one used for phase adjustment with respect to a direction orthogonal to the virtual plane S. The phase adjustment with ($\Delta Z$ component+$\Delta \Theta$ component) is needed for the adjustment of the orientation of each of the plurality of antenna front surfaces. In this adjustment, an amount of adjustment of $2\pi n$ (n is an integer) can be subtracted from the amount of phase adjustment for each of the plurality of antenna front surfaces.

Thus, the control satellite 2 can calculate the amount of phase adjustment to be made to the microwave which each of the plurality of power satellites 1 will transmit. A part of the functionality can be included in each of the plurality of power satellites. In this case, the control satellite 2 catches the beacon signal from the electric power base 4, and recognizes the direction of the electric power base 4 so as to define the virtual plane S. The control satellite 2 also measures the location of each of the plurality of power satellites 1, and notifies each of the plurality of power satellites 1 of the virtual plane S and the location of each of the plurality of power satellites 1. Each of the plurality of power satellites 1 calculates the amount of phase adjustment, as mentioned above, based on the notified virtual plane S and the notified location of each of the plurality of power satellites 1.

Next, the structure of each of the plurality of power satellites 1 and the structure of the control satellite 2 will be explained with reference to FIG. 3. Each of the plurality of power satellites 1 is provided with a condensing unit 6 for focusing sunlight rays in space to an area, the condensing unit 6 being constructed of a catoptric system, a dioptric system, or the like. Each of the plurality of power satellites 1 further includes a photoelectric conversion unit 7 for receiving the sunlight focused by the condensing unit 6 and for converting the focused sunlight into electrical energy, a transmission unit 8 for converting the electrical energy generated by the photoelectric conversion unit 7 into a microwave, and a transmission antenna 9 for sending out the microwave to space. The transmission unit 8 is provided with a receiving antenna 10 for receiving a control signal from the control satellite 2, an amplifier 11 for amplifying a reference signal f0 included in the control signal, a phase shifter 12 for phase-shifting the microwave according to the amount of phase adjustment included in the control signal, an incoherent modulator 13 for modulating the microwave output from the phase shifter 12 by using a modulation technique, such as a spread-spectrum modulation, so as to output an incoherent microwave, and a high power amplifier 14 for amplifying the incoherent microwave from the incoherent modulator 13 with high power so as to output a microwave having power corresponding to the electrical energy generated by the photoelectric conversion unit 7. The transmission unit 8 further includes a demodulation unit (DEM) 15 for demodulating the control signal from the control satellite 2, and a functional unit 16 for generating and providing an instruction to the phase shifter 12 based on the amount of phase adjustment included in the control signal. Each of the plurality of power satellites 1 further includes a corner reflector 17 disposed to enable the control satellite 2 to measure the location of each of the plurality of power satellites 1. The corner reflector 17 only has to reflect either light or electromagnetic waves including light. The control satellite 2 is provided with an oscillator 18 for generating the reference signal f0, a mixer 19 for mixing a signal modulated according to the amount of phase adjustment calculated for each of the plurality of power satellites into the reference signal f0 so as to generate the control signal, an amplifier 20 for amplifying the control signal to transmit the control signal to each of the plurality of power satellites 1, and a transmission antenna 21. The control satellite 2 is further provided with a location measurement unit 22 for measuring the location of each of the plurality of power satellites 1. A laser measurement unit can be used as the location measurement unit 22, and a measurement unit using an electromagnetic wave can be alternatively used. The control satellite 2 further includes a phase adjustment amount calculation unit 23 for calculating the amount of phase adjustment for each of the plurality of power satellites 1 based on the above-mentioned principle underlying the calculation of the phase adjustment amount, and a modulator 24 for modulating a signal according to the amount of phase adjustment calculated by the phase adjustment amount calculation unit 23.

Next, conversion of sunlight into a microwave and transmission of the microwave in each of the plurality of power satellites 1 will be explained. Each of the plurality of power satellites 1 focuses sunlight to the photoelectric conversion unit 7 by means of the condensing unit 6. This is because the energy density of the sunlight which the photoelectric conversion unit 7 constructed of a number of solar cells receives can be increased by focusing the sunlight to the photoelectric conversion unit 7. The condensing unit 6 can consist of a reflector or the like having a diameter of up to several tens of meters. As an alternative, the photoelectric conversion unit 7 can be so constructed as to receive sunlight directly, instead of the provision of the condensing unit 6. The photoelectric conversion unit 7 can consist of a plurality of solar panels arranged, and receive sunlight focused by the condensing unit 6 or directly receive sunlight and then photoelectric-convert the received sunlight into electrical energy. The electrical energy generated by the photoelectric conversion unit 7 is then input to the high power amplifier 14 within the transmission unit 8. Since the output of a solar cell is a DC component in general, the output is therefore changed in voltage and stabilized properly and is then input to the high power amplifier. The transmission unit 8 generates a microwave from the reference signal f0 included in the control signal which the transmission unit 8 has received from the control satellite 2 by way of the receiving antenna 10. The purpose of receiving the reference signal f0 from the control satellite 2 is to make the respective reference signals in the plurality of power satellites 1 in phase with one another. The reference signal f0 is then amplified by the amplifier 11 and is phase-shifted by the phase shifter 12. The incoherent modulator 13 modulates the microwave output from the phase shifter 12 by using a modulation technique, such as a spread-spectrum modulation, so as to output an incoherent microwave. The spreadspectrum modulation is a modulation technique that reduces the strength of the output microwave and spreads a band of transmitted frequencies over a broad band, thereby preventing the interference between the output microwave and other microwaves. Fundamentally, the total energy of the output microwave is the same as that not-yet-spreadspectrum-modulated. The high power amplifier 14 amplifies the incoherent microwave from the incoherent modulator 13 with high power so as to output a microwave having power corresponding to the electrical energy generated by the photoelectric conversion unit 7. This microwave is sent out to space by way of the transmission antenna 9. The phase shifter 12 is instructed by the functional unit 16 to phase-shift the microwave from the amplifier 11 based on the amount of phase adjustment included in the control signal from the control satellite 2. The control signal from the control satellite 2 includes a signal which has been modulated according to the amount of phase adjustment calculated for each of the plurality of power satellites 1. The demodulation unit 15 demodulates the control signal. The functional unit 16 generates bit information to be set to the phase shifter 12 based on the demodulated amount of phase adjustment.

Next, the control of each of the plurality of power satellites by the control satellite 2 will be explained. The control satellite 2 sends light or the like aiming at the corner reflector 17 located on each of the plurality of power satellites 1 to measure the location of each of the plurality of power satellites 1 by means of the location measurement unit 22. The phase adjustment amount calculation unit 23 then calculates the amount of phase adjustment for each of the plurality of power satellites 1 from data on the measured location of each of the plurality of power satellites according to the above-mentioned principle underlying the phase adjustment amount calculation. The modulator 24 modulates a signal according to the amount of phase adjustment calculated for each of the plurality of power satellites 1. The oscillator 18 generates a reference signal f0 to be used by each of the plurality of power satellites, and the mixer 19 mixes the signal modulated according to the amount of phase adjustment into the reference signal f0 so as to generate a control signal. The amplifier 20 amplifies the control signal to transmit it to each of the plurality of power satellites 1, and then transmits the amplified control signal to each of the plurality of power satellites 1 by way of the transmission antenna 21. The control satellite 2 further includes a communications antenna (not shown in FIG. 3) for catching the beacon signal from the electric power base 4 in order to define the virtual plane S for the calculation of the phase adjustment amount.

By adding one or more power satellites 1 constructed as above and applying the control signal from the control satellite 2 constructed as above to the added one or more power satellites, all of the generated microwaves including the microwaves from the added one or more power satellites can be made to be in phase with one another. Therefore, the electric power generation capability can be improved regardless of a limit on the photoelectric conversion capability of each of the plurality of power satellites 1, a limit on the high power amplification capability of each of the plurality of power satellites 1, and a limit on the power transmission capability.

Next, the structure of the electric power base 4 will be explained with reference to FIG. 4. The electric power base 4 includes a plurality of receiving antennas 25 that constitute the electric power base antenna 3 for receiving microwaves from the plurality of power satellites 1, a plurality of DC converters 26 each for converting one received microwave to DC electric power, and a DC electric power transmission system 27 for transmitting the DC electric power. The electric power base 4 transmits a beacon signal to enable the control satellite 2 to determine the direction of the electric power base 4 to the control satellite by way of the satellite communication antenna 5, which are not shown in FIG. 4.

Each of the plurality of DC converters 26 converts a microwave from one power satellite 1, which has been received by the corresponding receiving antenna 25 of the electric power base 4, into a low-frequency wave. A plurality of low-frequency waves thus generated by the plurality of DC converters 26 are then combined and the composite low-frequency wave is transmitted by the DC electric power transmission system 27. Since the area occupied by the plurality of receiving antennas is large as mentioned above, the electric power base 4 can be constructed on a frontier such as the coastal area of a solitary island, or a desert. Therefore, the DC electric power transmission system 27 should transmit the generated electric power to towns and cities with a high degree of transmission efficiency.

In accordance with the embodiment of the present invention, the space photovoltaic power generation system can thus transmit electric power generated in space from sunlight by means of the plurality of power satellites 1 to the electric power base 4 so that the electric power is dispersed without concentrating the electric power generated to a point on the electric power base 4.

Many widely different embodiments of the present invention may be constructed without departing from the spirit and scope of the present invention. It should be understood that the present invention is not limited to the specific embodiments described in the specification, except as defined in the appended claims.

What is claimed is:

1. A space photovoltaic power generation system comprising:
   a plurality of power satellites each for generating electrical energy from sunlight in space, for generating a microwave from the generated electrical energy, and for transmitting the microwave;
   an electric power base located at a remote site for receiving a plurality of microwaves transmitted from said plurality of power satellites, and for generating electric power from the plurality of microwaves received; and
   a control means within a control satellite for controlling said plurality of power satellites so that the plurality of microwaves transmitted from said plurality of power satellites to said electric power base are in phase with one another.

2. The space photovoltaic power generation system according to claim 1, wherein said control means includes a location measurement means for measuring a location of each of said plurality of power satellites, a phase adjustment amount calculation means for calculating an amount of phase adjustment to be made to the microwave which each of said plurality of power satellites will transmit from the measured location, and a phase control means for adjusting a phase of the microwave which each of said plurality of power satellites will transmit according to the amount of phase adjustment calculated by said phase adjustment amount calculation means so that the plurality of microwaves transmitted from said plurality of power satellites to said electric power base are in phase with one another.

3. The space photovoltaic power generation system according to claim 2, wherein said control satellite includes said location measurement means, said phase adjustment amount calculation means, and a transmission means for informing each of said plurality of power satellites of the amount of phase adjustment calculated for each of said plurality of power satellites.

4. The space photovoltaic power generation system according to claim 3, wherein each of said plurality of power satellites includes a receiving means for receiving the amount of phase adjustment from said control satellite, a target for enabling said control means to measure the location of each of said plurality of power satellites, a condensing means for focusing sunlight in space, a photoelectric conversion means for receiving and converting the sunlight focused by said condensing means into electrical energy, and a transmission means that also serves as said phase control means, for generating a microwave based on the electrical energy from said photoelectric conversion means, for adjusting the phase of the microwave according to the amount of phase adjustment received by said receiving means, and for transmitting the microwave to said electric power base.

5. The space photovoltaic power generation system according to claim 4, wherein said location measurement means of said control satellite is a means for measuring the location of each of said plurality of power satellites using said target disposed in each of said plurality of power satellites, and said transmission means of said control satellite is a means for transmitting a control signal including the amount of phase adjustment calculated by said phase adjustment amount calculation means to each of said plurality of power satellites.

6. The space photovoltaic power generation system according to claim 2, wherein said control satellite includes said location measurement means, and a transmission means for informing each of said plurality of power satellites of data on the location of each of said plurality of power satellites measured by said location measurement means, and
   wherein each of said plurality of power satellites includes said phase adjustment amount calculation means and said phase control means, and adjusts the phase of the microwave which each of said plurality of power satellites will transmit so that the microwave is in phase with any other microwave transmitted from any other one of said plurality of power satellites according to the calculated amount of phase adjustment.

7. The space photovoltaic power generation system according to claim 6, wherein each of said plurality of power satellites includes a target for enabling said location measurement means of said control means to measure the location of each of said plurality of power satellites, a condensing means for focusing sunlight in space, a photoelectric conversion means for receiving and converting the sunlight focused by said condensing means into electrical energy, and a transmission means that also serves as said phase control means, for generating a microwave based on the electrical energy from said photoelectric conversion means, for adjusting the phase of the microwave according to the amount of phase adjustment calculated by said phase adjustment amount calculation means, and for transmitting the microwave to said electric power base.

8. The space photovoltaic power generation system according to claim 7, wherein said location measurement means of said control satellite is a means for measuring the location of each of said plurality of power satellites using said target disposed in each of said plurality of power satellites, and said transmission means of said control satellite is a means for transmitting a control signal including data on the location of each of said plurality of power satellites measured by said location measurement means to each of said plurality of power satellites.

9. The space photovoltaic power generation system according to claim 1, wherein said control means transmits an identical reference signal to each of said plurality of power satellites, and each of said plurality of power satellites generates a microwave based on the reference signal received and transmits the microwave to said electric power base.

10. The space photovoltaic power generation system according to claim 3, wherein said electric power base includes a transmission means for transmitting a beacon signal to said control satellite, a receiving means for receiving the plurality of microwaves transmitted from said plurality of power satellites, a microwave-to-DC conversion means for converting the plurality of microwaves received by said receiving means into DC electric power, and a DC electric power transmission means for transmitting the DC electric power obtained by said microwave-to-DC conversion means.

11. The space photovoltaic power generation system according to claim 6, wherein said electric power base includes a transmission means. for transmitting a beacon signal to said control satellite, a receiving means for receiving the plurality of microwaves transmitted from said plurality of power satellites, a microwave-to-DC conversion means for converting the plurality of microwaves received by said receiving means into DC electric power, and a DC electric power transmission means for transmitting the DC electric power obtained by said microwave-to-DC conversion means.

12. A power satellite comprising:
a condensing means for focusing sunlight in space;
a photoelectric conversion means for receiving and converting the sunlight focused by said condensing means into electrical energy;
a transmission means for generating a microwave based on the electrical energy from said photoelectric conversion means, for adjusting a phase of the microwave so that the microwave is in phase with any other microwave transmitted by any other power satellite, and for transmitting the microwave to space; and
a receiving means for receiving an amount of phase adjustment from a control satellite that is required so the microwave is in phase with said any other microwave transmitted by any other power satellite.

13. A control satellite comprising:
a location measurement means for measuring a location of each of a plurality of power satellites, each of which generates a microwave from sunlight in space and transmits the microwave, by using a target disposed in each of said plurality of power satellites;
a phase adjustment amount calculation means for calculating an amount of phase adjustment to be made to the microwave which each of said plurality of power satellites will transmit from the location of each of said plurality of power satellites measured by said location measurement means; and
a transmission means for transmitting a control signal including the amount of phase adjustment calculated by said phase adjustment amount calculation means to each of said plurality of power satellites.

14. A space photovoltaic power generation system comprising:
a plurality of power satellites each configured to generate electrical energy from sunlight in space, to generate a microwave from the generated electrical energy, and to transmit the microwave;
an electric power base located at a remote site and configured to receive a plurality of microwaves transmitted from said plurality of power satellites, and to generate electric power from the plurality of microwaves received; and
a control satellite configured to control said plurality of power satellites so that the plurality of microwaves transmitted from said plurality of power satellites to said electric power base are in phase with one another.

15. The space photovoltaic power generation system according to claim 14, wherein said control satellite further includes a location measurement unit configured to measure a location of each of said plurality of power satellites, a phase adjustment amount calculation unit configured to calculate an amount of phase adjustment to be made to the microwave which each of said plurality of power satellites will transmit from the measured location, and a phase control unit configured to adjust a phase of the microwave which each of said plurality of power satellites will transmit according to the amount of phase adjustment calculated by said phase adjustment amount calculation unit so that the plurality of microwaves transmitted from said plurality of power satellites to said electric power base are in phase with one another.

16. The space photovoltaic power generation system according to claim 15, wherein said control satellite further includes a transmission unit configured to inform each of said plurality of power satellites of the amount of phase adjustment calculated for each of said plurality of power satellites.

17. The space photovoltaic power generation system according to claim 16, wherein each of said plurality of power satellites includes a receiving unit configured to receive the amount of phase adjustment from said control satellite, a target configured to enable said control unit to measure the location of each of said plurality of power satellites, a condensing unit configured to focus sunlight in space, a photoelectric conversion configured to receive and convert the sunlight focused by said condensing unit into electrical energy, and a transmission unit that also serves as said phase control unit and configured to generate a microwave based on the electrical energy from said photoelectric conversion unit, to adjust the phase of the microwave according to the amount of phase adjustment received by said receiving unit, and to transmit the microwave to said electric power base.

18. The space photovoltaic power generation system according to claim 17, wherein said location measurement unit of said control satellite is configured to measure the location of each of said plurality of power satellites using said target disposed in each of said plurality of power satellites, and said transmission unit of said control satellite is configured to transmit a control signal including the amount of phase adjustment calculated by said phase adjustment amount calculation unit to each of said plurality of power satellites.

19. The space photovoltaic power generation system according to claim 15, wherein the control satellite further includes a transmission unit configured to inform each of said plurality of power satellites of data on the location of each of said plurality of power satellites measured by said location measurement unit, and wherein each of said plurality of power satellites includes said phase adjustment amount calculation unit and said phase control unit, and adjusts the phase of the microwave which each of said plurality of power satellites will transmit so that the microwave is in phase with any other microwave transmitted from any other one of said plurality of power satellites according to the calculated amount of phase adjustment.

20. The space photovoltaic power generation system according to claim 14, wherein said control satellite transmits an identical reference signal to each of said plurality of power satellites, and each of said plurality of power satellites generates a microwave based on the reference signal received and transmits the microwave to said electric power base.

* * * * *